(12) United States Patent  (10) Patent No.: US 6,588,818 B2
Frazier et al.                  (45) Date of Patent:    Jul. 8, 2003

(54) VEHICLE ACCESSORY-MOUNTING ASSEMBLY

(75) Inventors: William Frazier, Poneto, IN (US); Jason R. Thompson, Fort Wayne, IN (US); Matthew R. LaFontaine, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 1 day.

(21) Appl. No.: 09/811,922

(22) Filed: Mar. 19, 2001

(65) Prior Publication Data

US 2002/0130240 A1 Sep. 19, 2002

(51) Int. Cl.[7] .................................................. B60R 1/06
(52) U.S. Cl. ........................................ 296/1.1; D12/187
(58) Field of Search ........................... 296/1.1; 359/602; D12/187; 248/475.1

(56) References Cited

U.S. PATENT DOCUMENTS

| 2,751,817 | A | * | 6/1956 | Lapekas | 248/486 |
| 2,839,965 | A | * | 6/1958 | Budreck | 248/480 |
| 3,114,530 | A | * | 12/1963 | Shilling | 248/476 |
| 3,596,079 | A | * | 7/1971 | Clark et al. | 362/144 |
| 4,077,597 | A | * | 3/1978 | Greig | 248/477 |
| 4,789,232 | A | * | 12/1988 | Urbanek | 248/549 |
| 5,022,748 | A | * | 6/1991 | Espirito Santo | 359/881 |
| 5,044,596 | A | * | 9/1991 | Espirito Santo | 248/479 |
| D457,114 | S | * | 5/2002 | Lang et al. | D12/187 |
| D462,305 | S | * | 9/2002 | Abalos et al. | D12/187 |
| 2002/0067252 | A1 | * | 6/2002 | Miyabukuro | 340/463 |
| 2002/0130240 | A1 | * | 9/2002 | Frazier et al. | 248/476 |

FOREIGN PATENT DOCUMENTS

| EP | 379733 | * | 8/1990 | 248/475.1 |
| GB | 2229981 A | * | 10/1990 | 359/879 |

* cited by examiner

Primary Examiner—D. Glenn Dayoan
Assistant Examiner—Paul Chenevert
(74) Attorney, Agent, or Firm—Jeffrey P. Calfa; Neil T. Powell; Dennis Kelly Sullivan

(57) ABSTRACT

An accessory-mounting assembly for mounting accessories at a distance from exterior surfaces of a vehicle. The accessory-mounting assembly is constructed such that it has a "break away" feature whereby an accessory-mounting component may pivot about a pivot axis when it is subjected to a substantial impact. Thus, the risk of damage to the vehicle, the accessory-mounting assembly, and the accessories mounted to the accessory-mounting assembly when the accessory-mounting assembly is subjected to a substantial impact is reduced. The accessory-mounting assembly includes four brackets that are fixedly engaged to exterior surfaces of the vehicle and from which the other components of the accessory mounting assembly are suspended. Three of the four brackets that are fixedly engaged to the vehicle are integrally engaged to one another.

7 Claims, 16 Drawing Sheets

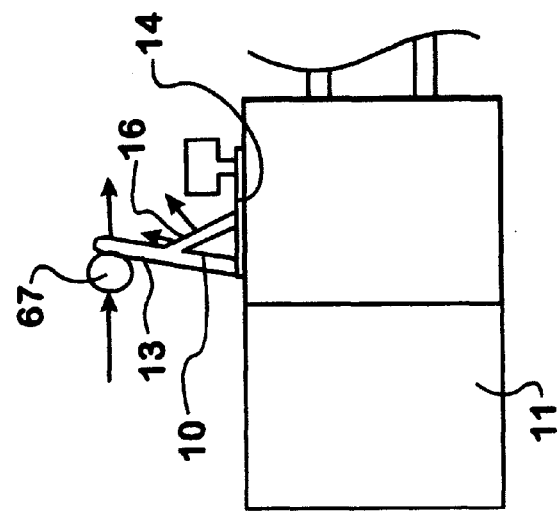
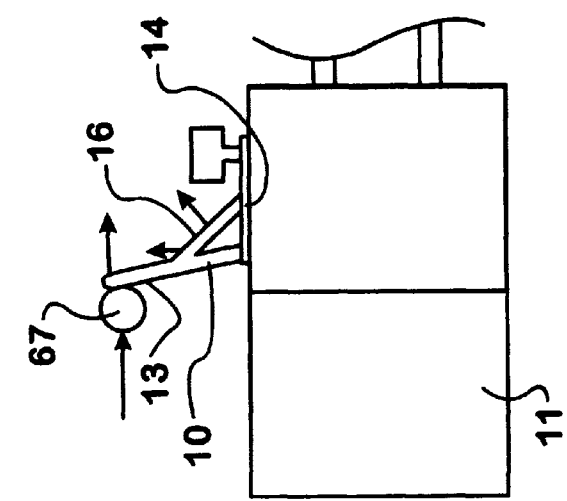
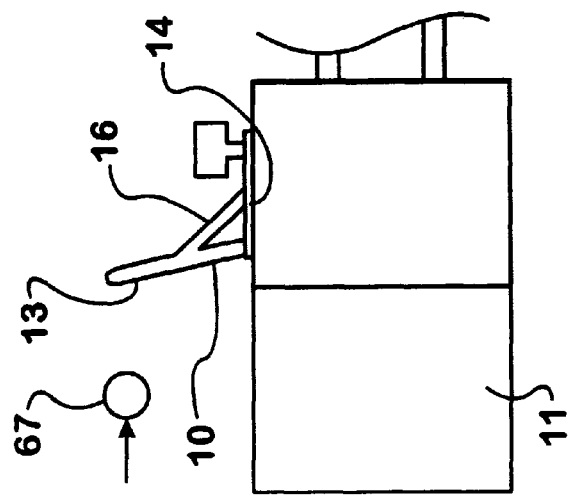
FIG. 1

VEHICLE ACCESSORY-MOUNTING ASSEMBLY

BACKGROUND OF THE INVENTION

The present invention relates to accessory-mounting assemblies for mounting accessories at a distance from exterior surfaces of a vehicle. Such accessories that are mounted at a distance from exterior surfaces of a vehicle, the accessory-mounting assemblies to which the accessories are mounted, and the vehicle, are all vulnerable to damage if the accessories or the accessory-mounting assemblies are subjected to a substantial impact. In order to prevent damage to any of these components, such accessory-mounting assemblies are often constructed such that they have a "break away" feature. The "break away" feature of an accessory-mounting assembly allows the accessory-mounting assembly and or the accessories that are mounted to it to absorb the energy of impacts by moving in intended directions when the accessory-mounting assembly and/or the accessories that are mounted to it are subjected to an impact. For instance, some accessory-mounting systems include an accessory-mounting component that is pivotally engaged to a first pivot bracket and a second pivot bracket. The first pivot bracket and the second pivot bracket, of such an accessory-mounting system, are generally fixedly engaged to exterior surface(s) of the vehicle. The accessory-mounting component of such an accessory-mounting system generally can be pivoted about a pivot axis that extends through the points of engagement of the accessory-mounting component to the first pivot bracket and the second pivot bracket. Thus, when the accessory-mounting component and/or any accessories that are mounted to the accessory-mounting component are subjected to a substantial impact in directions perpendicular to the pivot axis, the accessory-mounting component will pivot about the pivot axis. This "break away" feature of such an accessory-mounting assembly allows the accessory-mounting assembly to absorb impacts in directions perpendicular to the pivot axis while reducing the risk that the vehicle, the accessory-mounting assembly, or the accessories mounted to the accessory-mounting assembly will be damaged. Such accessory-mounting assemblies often have an anti-rotation member engaged at a first end to the accessory-mounting component and at a second end to an anti-rotation bracket. The anti-rotation bracket is generally fixedly engaged to an exterior surface of the vehicle. The purpose of the anti-rotation member is to prevent forces imparted to the accessory-mounting assembly during normal operation of the vehicle from causing undesirable rotation of the accessory-mounting component about the pivot axis. In general, accessory-mounting assemblies that have such an anti-rotation member still allow the accessory-mounting component to rotate about the pivot axis when the accessory-mounting component or the accessories mounted to it are subjected to a substantial impact in directions perpendicular to the pivot axis. In order to enable such functionality the engagement of the first end of the anti-rotation member to the accessory-mounting component and the engagement of the second end of the anti-rotation member to the anti-rotation bracket are usually "break away" style engagements. Such "break away" style engagements allow for "break away" motions between each respective end of the anti-rotation member and the component that it is engaged to when the engagement is subjected to relatively large forces. The "break away" motions of the anti-rotation member relative to the other components of the accessory-mounting assembly allow for rotation of the accessory-mounting component about the pivot axis. Such "break away" style engagements are, however, preferably constructed in a manner preventing forces imparted upon the accessory-mounting assembly as a result of events that occur during normal operation of the vehicle from causing the anti-rotation member to undergo its "break away" motions. Thus, the accessory-mounting component is held in its intended position during normal operation of the vehicle but will "break away" and rotate about the pivot axis when the accessory-mounting component or the accessories mounted to it are subjected to a substantial impact.

In addition to the first pivot bracket, the second pivot bracket, and the anti-rotation bracket described above a vehicle may also have component-mounting brackets for mounting additional components to exterior surfaces of the vehicle. The proliferation of such brackets mounted to a vehicle can be expensive for a number of reasons. It is often costly to purchase unique machinery to make each different type of bracket for mounting to exterior surfaces of the vehicle. It is also labor intensive and therefore costly to assemble numerous brackets to accessories, components of accessory-mounting assemblies and the vehicle.

SUMMARY OF INVENTION

It is thus an object of the present invention to provide an accessory-mounting assembly that makes it possible to mount a number of accessories at a distance from exterior surfaces of a vehicle while employing a minimum number of brackets mounted to exterior surfaces of the vehicle. It is a further object of the present invention to provide such an accessory-mounting assembly that has a "break away" feature to reduce the risk that substantial impacts to the accessory-mounting assembly or the accessories that are mounted to it will cause damage to the vehicle, the accessory-mounting assembly, or the accessories mounted to the accessory-mounting assembly. The accessory-mounting assembly of the present invention includes an accessory-mounting component. The accessory-mounting component is engaged to a first pivot bracket and a second pivot bracket. The engagement of the accessory-mounting component to the first pivot bracket and the second pivot bracket is such that the accessory-mounting component can be pivoted about a pivot axis. The pivot axis extends through a point of engagement between the accessory-mounting component and the first pivot bracket and through a point of engagement between the accessory-mounting component and the second pivot bracket. The first pivot bracket and the second pivot bracket are fixedly engaged to exterior surfaces of the vehicle. The accessory-mounting assembly of the present invention also includes an anti-rotation member. A first end of the anti-rotation member is engaged to the accessory-mounting component. A second end of the anti-rotation member is engaged to an anti-rotation bracket. The anti-rotation bracket of the present invention is integrally engaged to the first pivot bracket. Because the anti-rotation bracket is constructed of one and the same component as the first pivot bracket, costs for producing machinery to produce the two brackets are minimized and labor to assemble the accessory-mounting assembly is also minimized. The combined first pivot bracket and anti-rotation bracket spans portions of exterior surfaces of the vehicle that are generally left void of componentry by accessory-mounting assemblies that employ a first pivot bracket and an anti-rotation bracket that are separate components. Thus, the combined first pivot bracket and anti-rotation bracket provide greater structural reinforcement for exterior surfaces of the vehicle than would an accessory-mounting assembly that utilized a separate first pivot bracket and anti-rotation bracket. The combined first pivot bracket and anti-rotation bracket also generally reduces the cost to provide for the engagement of the first pivot bracket and the anti-rotation bracket to the exterior surfaces of the vehicle as compared to an accessory-mounting assembly employing a separate first pivot bracket and anti-rotation bracket. The combined first pivot bracket and anti-rotation bracket generally require less fasteners and less locating features such as holes, tabs, notches, or recesses in the exterior surfaces of the vehicle than would a separate first pivot bracket and anti-rotation bracket. The purpose of the anti-rotation member is to prevent forces imparted to the accessory-mounting assembly as a result of events that occur during normal operation of the vehicle from causing undesirable rotation of the accessory-mounting component about the pivot axis. The accessory-mounting assembly does, however, allow the accessory-mounting component to rotate about the pivot axis when the accessory-mounting component or the accessories mounted to it are subjected to a substantial impact in directions perpendicular to the pivot axis. The action of the accessory-mounting component rotating about the pivot axis in response to a substantial impact, which is generally referred to as "breaking away", is intended to reduce the risk of damage to the vehicle and the accessory-mounting assembly when the accessory-mounting component absorbs impacts. In order to enable this functionality the engagement of the first end of the anti-rotation member to the accessory-mounting component and the engagement of the second end of the anti-rotation member to the second pivot bracket are "break away" style engagements. Such "break away" style engagements allow for "break away" motions between each respective end of the anti-rotation member and the component that it is engaged to when the engagement is subjected to relatively large forces as a result of the accessory mounting component being subjected to a substantial impact. The "break away" motions of the anti-rotation member relative to the other components of the accessory-mounting assembly allow for rotation of the accessory-mounting component about the pivot axis. Such "break away" style engagements are, however, preferably constructed in a manner preventing relatively small forces imparted upon the accessory-mounting assembly as a result of events that occur during normal operation of the vehicle from causing the anti-rotation member to undergo its "break away" motions. Thus, the accessory-mounting component is held in its intended position during normal operation of the vehicle but will "break away" and rotate about the pivot axis when the accessory-mounting component or the accessories mounted to it are subjected to a substantial impact. One or more accessories are mounted to the accessory-mounting component of the accessory-mounting assembly. Thus, it can be seen that the above mentioned objects of the invention as well as others not mentioned have been met.

DRAWINGS

Other objects and advantages of the invention will become more apparent upon perusal of the detailed description thereof and upon inspection of the drawings in which:

FIG. 1 is a plan view showing an object travelling at and impacting the accessory-mounting assembly and the resulting "break away" motions of the accessory mounting assembly.

DETAILS OF INVENTION

Figure 2:
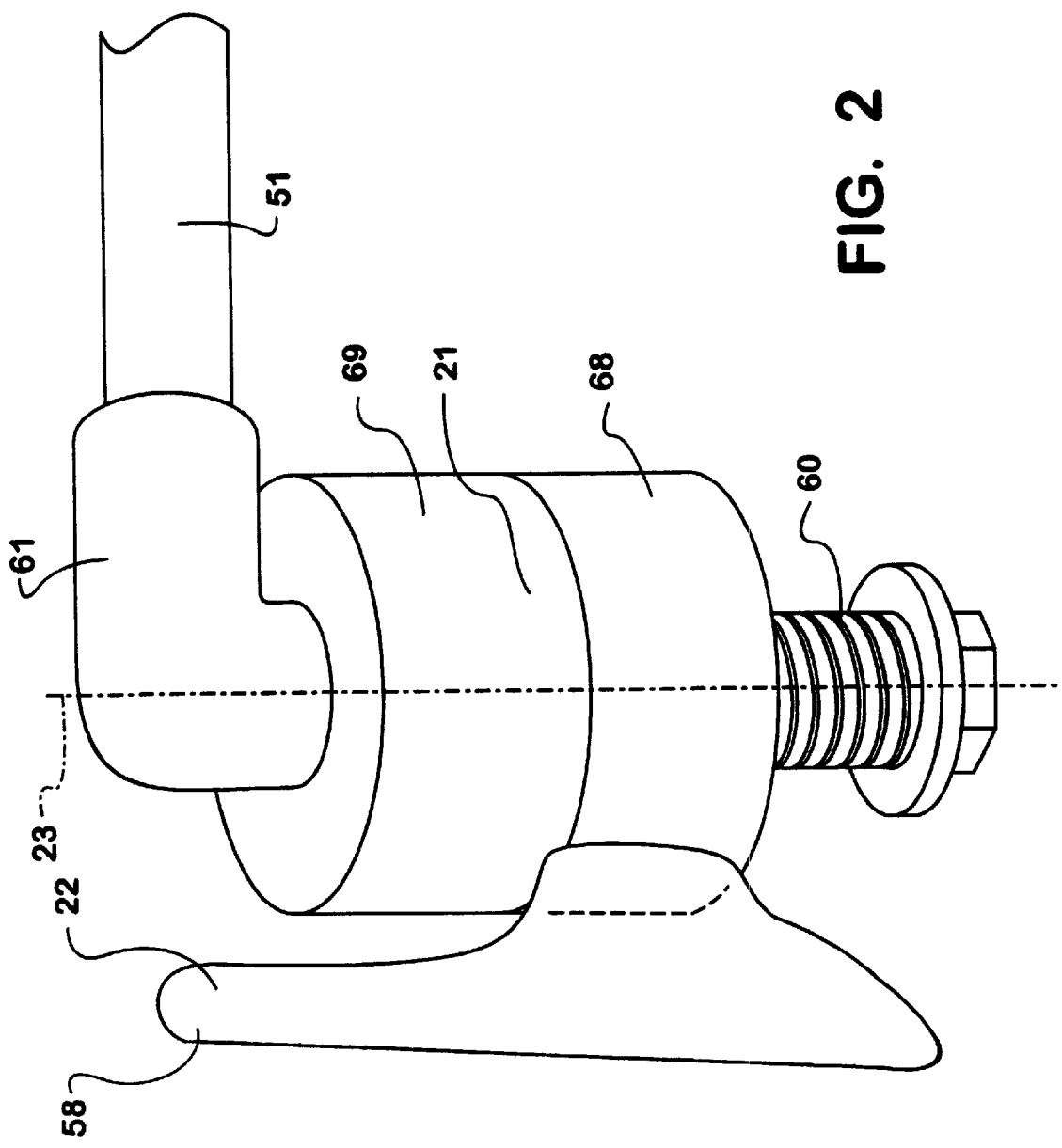
FIG. 2 is a perspective view of the detent structure of the accessory-mounting assembly.

The accessory-mounting assembly 10 of the present invention includes a first pivot bracket 14 and a second pivot bracket 15 that are both fixedly engaged to exterior surface(s) 12 of a vehicle 11. An accessory-mounting component 13 is engaged at a first point of engagement 20 to the first pivot bracket 14 and at a second point of engagement 21 to the second pivot bracket 15. The engagement of the accessory-mounting component 13 to the pivot brackets 22 is such that the only relative motion allowed between the accessory-mounting component 13 and the pivot brackets 22 is rotation about a pivot axis 23. The pivot axis 23 extends through the first point of engagement 20 and the second point of engagement 21. Those skilled in the art could easily imagine any of a number of ways that the accessory-mounting component 13 could be engaged to the pivot brackets 22 that would cause the accessory-mounting component 13 to be constrained as described. Types of engagement that would work include but are not limited to pinned engagements, bolted engagements, and ball and socket engagements. In the preferred embodiment, the accessory-mounting component 13 is engaged to each pivot bracket 22 by a bolt that protrudes through bolt holes defined by the accessory-mounting component 13 and each of the pivot brackets 22. The shank of each bolt that engages the accessory-mounting component 13 to the pivot brackets 22 is oriented substantially coincident with the pivot axis 23. One or more accessories 24 would be mounted to the accessory-mounting component 13.

During normal operation of the vehicle 11 it is generally undesirable for the accessory-mounting component 13 to rotate about the pivot axis 23. For this reason, the accessory-mounting assembly 10 of the present invention includes an anti-rotation member 16 engaged at a first end 18 to the accessory-mounting component 13 and at a second end 19 to an anti-rotation bracket 17. The anti-rotation member 16 prevents undesirable rotation of the accessory-mounting component 13 about the pivot axis 23 during normal operation of the vehicle 11. The anti-rotation member 16 is engaged to the accessory-mounting component 13 at a point distant from the pivot axis 23 and also to the anti-rotation bracket 17 at a point distant from the pivot axis 23. Therefore, the accessory-mounting component 13 cannot rotate about the pivot axis 23, unless the anti-rotation member 16 and the accessory-mounting component 13 move relative to one another. The construction of the accessory-mounting assembly 10 is such that relative motion between the anti-rotation member 16 and the accessory-mounting component 13 is prevented unless substantial forces are imposed upon the accessory-mounting component 13 in directions perpendicular to the pivot axis 23. Such substantial forces may be imposed upon the accessory-mounting component 13 in directions perpendicular to the pivot axis 23 when an individual forcefully adjusts the angular position of the accessory-mounting component 13 or when an object strikes the accessory-mounting component 13. Thus, the accessory-mounting component 13 is maintained in a constant position during normal operation of the vehicle 11 but can be moved to a different position by an individual if they so desire and can "break away" and rotate about the pivot axis 23 if subjected to a substantial impact. Because the accessory-mounting component 13 will "break away" when subjected to a substantial impact, there is a reduced risk that such an impact will cause damage to the vehicle 11, the accessory-mounting assembly 101 or the accessories 24.

In order that the accessory-mounting component 13 can "break away" in such a manner the accessory-mounting assembly 10 must be constructed in a manner such that the engagements of the anti-rotation member 16 to the accessory-mounting component 13 and the anti-rotation bracket 17 are "break away" style engagements 26. The engagements of the anti-rotation member 16 to these components must meet certain functional requirements in order to be considered "break away" style engagements. The "break away" style engagements 26 must cause the anti-rotation member 16 to undergo "break away" motions when relatively large forces are applied to the accessory-mounting component 13 in directions perpendicular to the pivot axis 23. When the anti-rotation member 16 undergoes such "break away" motions, the ends 25 of the anti-rotation member 16 move relative to the components that they are engaged to in a manner such that the accessory-mounting component 13 may rotate about the pivot axis 23. The construction of the anti-rotation member 16 and the other components of the accessory-mounting assembly 10 should be such that when the anti-rotation member 16 undergoes its "break away" motions the accessory-mounting assembly 10 is not damaged. In the preferred embodiment, a pivot end 28 of the anti-rotation member 16 is pivotally engaged to either the anti-rotation bracket 17 or the accessory-mounting component 13. The anti-rotation member 16 can, thus, pivot about an anti-rotation pivot axis 33 that is oriented substantially parallel to the pivot axis 23 and is located at the pivot end 28 of the anti-rotation member 16. In the preferred embodiment, a slide end 29, which is opposite the pivot end 28, of the anti-rotation member 16 is slideably engaged to whichever of the anti-rotation bracket 17 and the accessory-mounting component 13 that the pivot end 28 is not engaged to. Either the slide end 29 of the anti-rotation member 16 or the component to which the slide end 29 of the anti-rotation member 16 is engaged defines a slide recess 30. A slide member 31 is engaged to whichever of the slide end 29 of the anti-rotation member 16 and the component to which the slide end 29 is engaged, that does not define the slide recess 30. The slide member 31 is oriented such that a slide member axis 34 that defines a slide axis 32 is oriented substantially perpendicular to the anti-rotation member pivot axis 33. The slide member 31 is disposed within the slide recess 30. When relatively large forces are applied to the accessory-mounting component 13 in directions perpendicular to the pivot axis 23, relatively large forces are applied to the slide member 31 and component that defines the slide recess 30 in opposite directions parallel to the slide axis 32. These forces cause the slide member 31 to slide along the slide axis 32 within the slide recess 30. The "break away" motions of an anti-rotation member 16 of such an accessory mounting assembly 10 include the slide end 29 of the anti-rotation member 16 sliding along the slide axis 32 and the pivot end 28 of the anti-rotation member 16 rotating about the anti-rotation member pivot axis 33. As the anti-rotation member 16 undergoes such "break away" motions the accessory-mounting component 13 is allowed to rotate about the pivot axis 23. Numerous constructions and arrangements of the accessory-mounting assembly 10, other than those described for the preferred embodiment, would have engagements that would be considered appropriate "break away" style engagements of the anti-rotation member 16 to the other components of the accessory-mounting assembly 10. FIG. 1 shows the "break away" feature of the accessory-mounting assembly 10 in action. FIG. 1 shows an object 67 traveling toward the accessory-mounting component 13 of the accessory-mounting assembly 10 in a direction perpendicular to the pivot axis 23. The figure then shows the object 67 striking the accessory-mounting component 13 and the anti-rotation member 16 undergoing its "break away" motions as the accessory-mounting component 13 pivots about the pivot axis 23 away from the object 67 and absorbs the energy of the impact.

As was mentioned above, the purpose of the anti-rotation member 16 is to prevent undesirable rotation of the accessory-mounting component 13 about the pivot axis 23 during normal operation of the vehicle 11. Normal vibrations of the vehicle 11, vertical accelerations of the vehicle 11 when it travels uneven surfaces, airflow past the vehicle 11, and acceleration of various components of the vehicle 11 such as doors are normal events that occur during normal operation of the vehicle 11. When these events occur during normal operation of the vehicle 11, relatively small forces are often imposed upon the accessory-mounting component 13 in directions perpendicular to the pivot axis 23. As a result, relatively small forces and/or moments are imposed upon the "break away" style engagements 26 of the anti-rotation member 16 to the other components of the accessory-mounting assembly 10. These relatively small forces and/or moments act on the "break away" style engagements 26 of the anti-rotation member 16 in appropriate directions to cause the anti-rotation member 16 to undergo its "break away" motions. The accessory-mounting assembly 10 is constructed to prevent the anti-rotation member 16 from undergoing its "break away" motions until the forces imposed upon the "break away" style engagements 26 reach a magnitude greater than what would be caused by events that occur during normal operation of the vehicle 11. The accessory-mounting assembly 10 may be constructed in any of a number of ways that cause this resistance to the "break away" motions of the anti-rotation member 16 during normal operation of the vehicle 11. The construction of the accessory-mounting assembly 10 may be such that friction between the components resists the "break away" motions of the anti-rotation member 16 during normal operation of the vehicle 11. Alternatively, springs may be engaged to the components of the accessory-mounting assembly 10 to resist "break away" motions of the anti-rotation member 16 during normal operation of the vehicle 11. In the preferred embodiment, motion between the slide recess 30 and the slide member 31 resists sliding of the slide member 31 along the slide axis 32 during normal operation of the vehicle 11. The amount of force necessary to cause the accessory-mounting component 13 to "break away" is proportional to the magnitude of the friction between the slide member 31 and the component that defines the slide recess 30. The construction (shape, size, material composition, and relative orientation and positioning) of the slide member 31 and the slide recess 30, obviously effects the magnitude of the friction between the slide recess 30 and the slide member 31. These attributes must be configured so that the friction between the slide recess 30 and the slide member 31 are of a magnitude great enough to prevent undesirable rotation of the accessory-mounting component 13 about the pivot axis 23 during normal operation of the vehicle. The risk that impacts to the accessory-mounting component 13 will cause damage to the vehicle 11 or the accessory-mounting assembly 10 is reduced as the force necessary to cause the accessory-mounting component 13 to "break away" is reduced. Therefore, the accessory-mounting assembly 10 is preferably constructed such that forces only slightly greater than those imposed upon the accessory-mounting component 13 as a result of events that occur during normal operation of the vehicle 11, will cause the accessory-mounting component 13 to "break away."

The accessory-mounting assembly 10 of the present invention may further have a component-mounting bracket 35. One or more accessories 24 would be directly mounted to the component-mounting bracket 35. The component-mounting bracket 35 of the present invention would be integrally engaged to the first pivot bracket 14. In the preferred embodiment, the first pivot bracket 14, the anti-rotation bracket 17, and the component-mounting bracket 35 (which are all integrally attached to one another) are fixedly engaged to a window frame upper portion 36 that is disposed above the window 37 of the door 36 of the vehicle 11. Also in the preferred embodiment, the one or more accessories 24 that are directly engaged to the component-mounting bracket 35 are comprised of a look down mirror 39. The look down mirror 39 extends down from the component-mounting bracket 35 so that a reflecting surface 40 of the look down mirror 39 is disposed adjacent to and facing the window 37. The look down mirror 39 could be engaged to the component-mounting bracket 35 in any of a number of ways. In the preferred embodiment, the look down mirror 39 defines one or more mounting ears 41 that protrude parallel to one another away from the reflecting surface 40 of the look down mirror 39. Each of the mounting ears 41 of the look down mirror 39 defines a mounting ear bore into or 42 through itself. The mounting ear bore 42 of each of the mounting ears 40 is aligned with the mounting ear bore 42 of each of the other mounting ears 41. A mounting ear bore axis 43 that extends down the center of each of the mounting ear bores 42 is oriented substantially parallel to the reflecting surface 40 of the look down mirror 39. One or more mounting tabs 44 extend parallel to one another from the component-mounting bracket 35 in a direction away from the window frame upper portion 36. Each of the mounting tabs 44 defines a mounting tab bore 45 into or through itself. The mounting tab bore 45 of each mounting tab 44 is aligned with the mounting tab bores 45 of each of the other mounting tabs 44. A mounting tab bore axis 46 extends through the center of each of the mounting tab bores 45. Each of the one or more mounting ears 41 is disposed adjacent one or more of the one or more mounting tabs 44 in a position such that the mounting ear bore axis 43 is coincident with the mounting tab bore axis 46. The mounting ears 41 and the mounting tabs 44 are preferably of a width, and are preferably spaced along the mounting ear bore axis 43 and mounting tab bore axis 46 such that there is minimal space 47 between adjacent mounting ears 41 and mounting tabs 44. The look down mirror 39 is pivotally engaged to the component-mounting bracket 35 by a pin disposed within the mounting ear bores 42 and the mounting tab bores 45. A look down mirror pivot axis 48, about which the look down mirror 39 can be pivoted with respect to the component-mounting bracket 35 is defined coincident with the mounting tab bore axis 46 and the mounting ear bore axis 43. In the preferred embodiment, the pin that pivotally engages the look down mirror 39 to the component-mounting bracket 35 is a bolt. In this embodiment the bolt is preferably threadedly engaged to a mounting ear bore 42 or a mounting tab bore 45 that is disposed near an end of the bolt opposite the head of the bolt. Thus, the bolt compresses mounting ears 41 and the mounting tabs 44 disposed between the head of the bolt and the opposite end of the bolt, toward one another along the look down mirror pivot axis 48. As a result there is friction between adjacent mounting ears 41 and mounting tabs 44 that resists rotation of the look down mirror 39 about the look down mirror pivot axis 48. The construction and engagement of the mounting ears 41 the mounting tabs 44, and the bolt effect the magnitude of the friction between the mounting ears 41 and the mounting tabs 44. Preferably the magnitude of this friction is small enough that a person might adjust the rotational position of the look down mirror 39 about the look down mirror pivot axis 48. Preferably the magnitude of this friction is great enough to prevent small forces that are imparted to the look down mirror 39 during normal operation of the vehicle 11 from causing undesirable rotation of the look down mirror 39 about the look down mirror pivot axis 48. The function of the look down mirror 39 is to allow an individual seated inside an occupant cabin 62 of the vehicle 11, on a side of the vehicle 11 opposite the look down mirror 39, to determine what is occurring in an area generally below the look down mirror 39. Such an individual would accomplish this task by looking through the window 37 and seeing in the reflecting surface 40 of the look down mirror 39 an image of the area generally below the look down mirror 39. Therefore, the component-mounting bracket 35 and the look down mirror 39 are preferably constructed such that the look down mirror pivot axis 48 is disposed generally parallel to the longitudinal axis of the vehicle 11. Preferably, the reflecting surface 40 is disposed generally parallel to the look down mirror pivot axis 48. A user of the look down mirror 39 will generally position the look down mirror 39 such that the reflecting surface 40 extends outwardly and downwardly from the component-mounting bracket 35 in order to enable use of the look down mirror 39 as described above.

As was mentioned above, an object of the present invention is to provide for the mounting of a number of accessories 24 at a distance from exterior surfaces 12 of the vehicle while employing a minimal number of brackets fixedly engaged to the exterior surfaces of the vehicle 11. The anti-rotation bracket 17 and the component-mounting bracket 35 are integrally engaged to the first pivot bracket 14. The cost of machinery to produce a first pivot bracket 14, anti-rotation bracket 17, and a component-mounting bracket 35 that are integrally engaged to one another is generally less than the cost of machinery to produce a first pivot bracket 14, an anti-rotation member 17, and a component-mounting bracket 35 that are separate, individual parts. Because the accessory-mounting assembly 10 of the present invention has numerous brackets integrally engaged to one another that are separate components in other accessory-mounting assemblies, the accessory-mounting assembly 10 of the present invention generally requires less labor to assemble and install to the vehicle 11. The combined first pivot bracket 14, anti-rotation bracket 17, and component-mounting bracket 35 spans portions of exterior surfaces 12 of the vehicle 11 that are generally left void of componentry by accessory-mounting assemblies 10 that employ similar brackets that are separate components. Thus, the combined first pivot bracket 14, anti-rotation bracket 17, and component-mounting bracket 35 provide greater structural reinforcement for exterior surfaces 12 of the vehicle 11 than would an accessory-mounting assembly 10 that includes similar brackets that are separate unique components. Provisions for the engagement of such a combined first pivot bracket 14, anti-rotation bracket 17, and component-mounting bracket 35 to the exterior surfaces 12 of the vehicle 11 are generally less costly than similar provisions for similar brackets that are separate unique components. The combined first pivot bracket 14, anti-rotation bracket 17, and component-mounting bracket 35 generally require less fasteners and less locating features such as holes, tabs, notches, or recesses in the exterior surfaces 12 of the vehicle 11 than would similar brackets that are separate unique components.

In the preferred embodiment, the accessory-mounting assembly 10 is intended to mount rear-view mirrors 54 to the vehicle 11. In the preferred embodiment, the accessory-mounting component 13 is a c-shaped component 49 that is comprised of a first leg 50, a second leg 51, and an intermediate member 52. The first leg 50 of the c-shaped component 49 is pivotally engaged to the first pivot bracket 14 which is fixedly engaged to the window frame upper portion 36. The second leg 51 is pivotally engaged to the second pivot bracket 15 which is fixedly engaged to a window frame lower portion 53. The intermediate member 52 is engaged to the first leg 50 at an end of the first leg 50 opposite the end of the first leg 50 that is engaged to the first pivot bracket 14. The intermediate member 52 is engaged to the second leg 51 at an end of the second leg 51 opposite the end of the second leg 51 that is engaged to the second pivot bracket 15. The one or more accessories 24 that are mounted to the accessory-mounting component 13 are comprised of one or more rear-view mirrors 54 mounted to said intermediate member 52 of said c-shaped component 49. The first end 18 of the anti-rotation member 16 is engaged to the first leg 50 of the c-shaped component 49 at a point distant from the point at which the first leg 50 is pivotally engaged to the first pivot bracket 14. In this embodiment, the accessory-mounting assembly 10 is preferably constructed and engaged to the vehicle 11 in an orientation such that the pivot axis 23 about which the c-shaped member 49 is pivotal is oriented substantially vertically. Preferably the slide recess 30 and the slide member 31 are of sufficient length that they may remain engaged to one another when the accessory-mounting component 13 is at any of a number of positions within a range of angles relative to the pivot axis 23. This makes ft possible for a user of the vehicle 11 to adjust the accessory-mounting component 13 to any of the positions within the range of angles relative to the pivot axis 23 while the functionality of the accessory-mounting assembly 10 is maintained.

Figure 3:
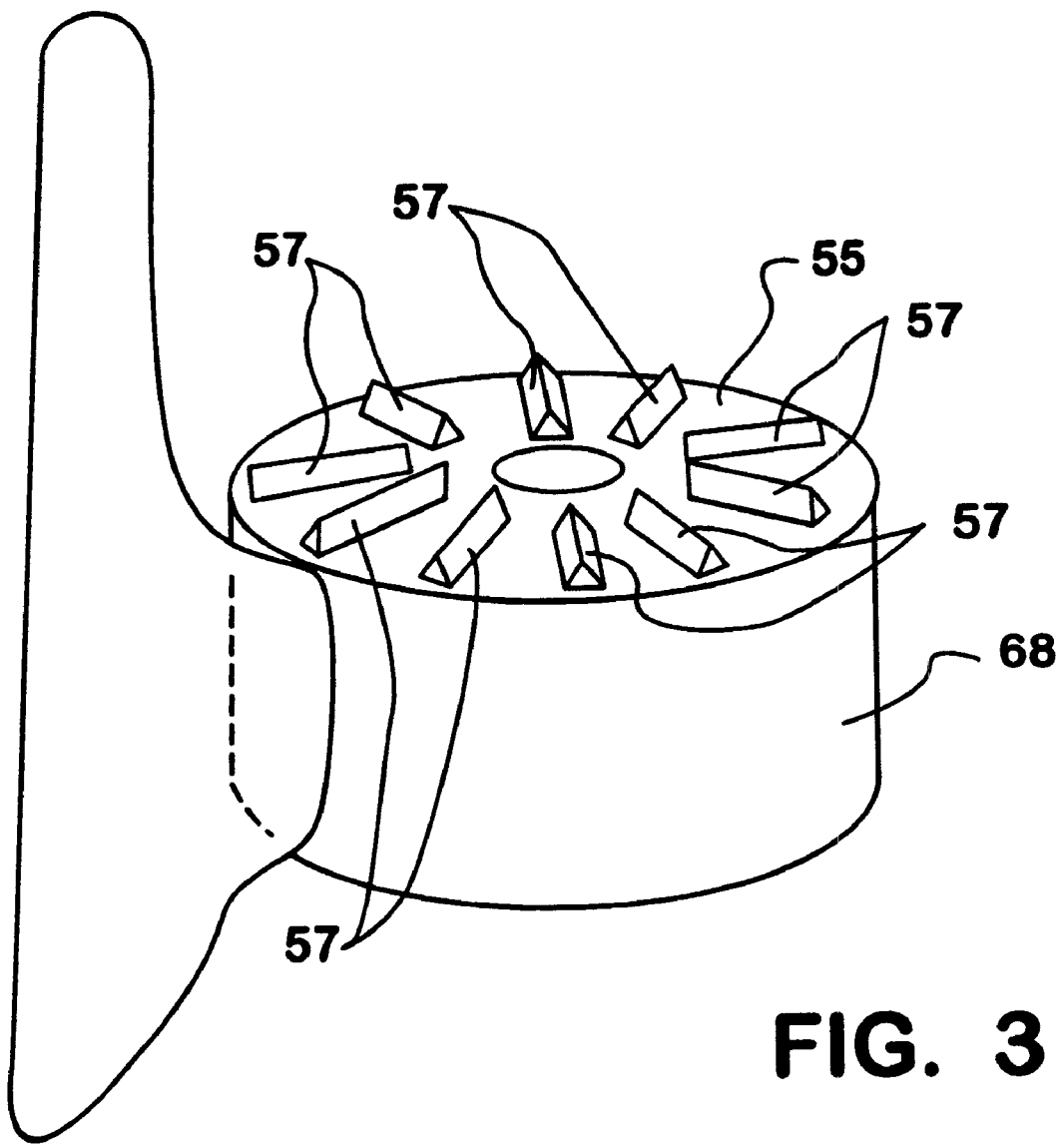
FIG. 3 is a perspective view of a detent projection component.
Figure 4:
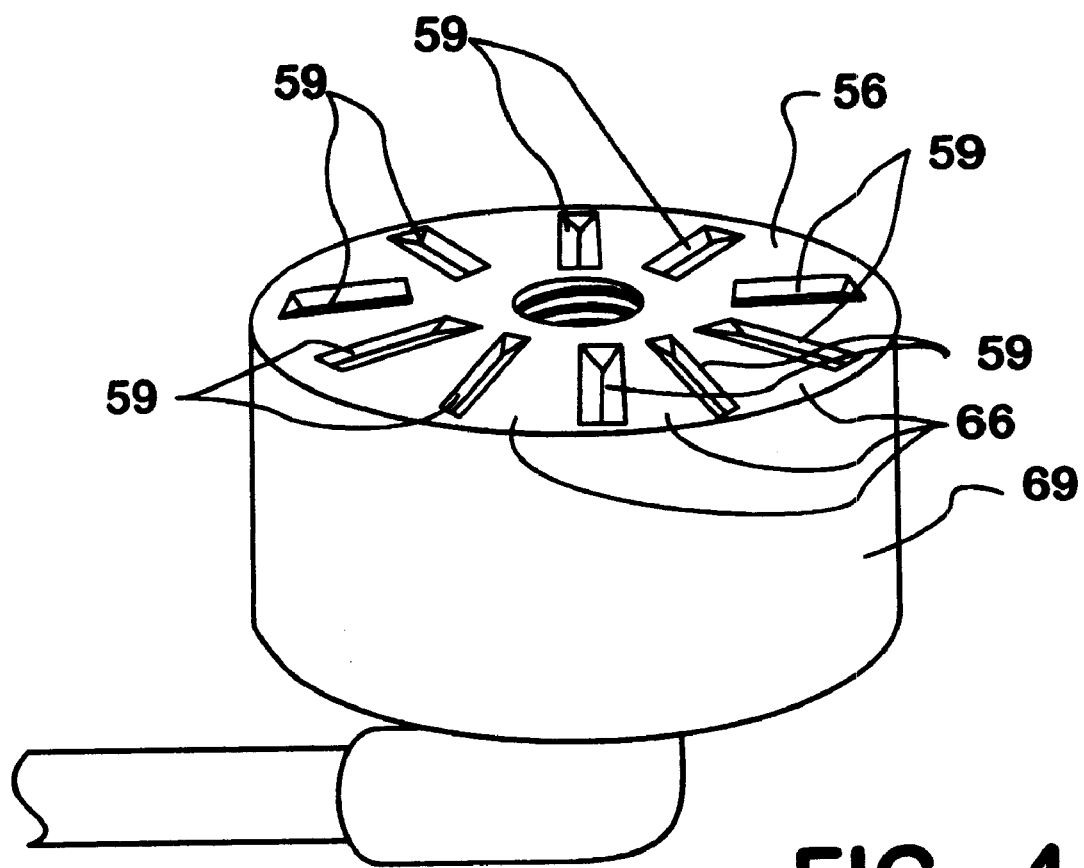
FIG. 4 is a perspective view of a detent recess component.
Figure 5:
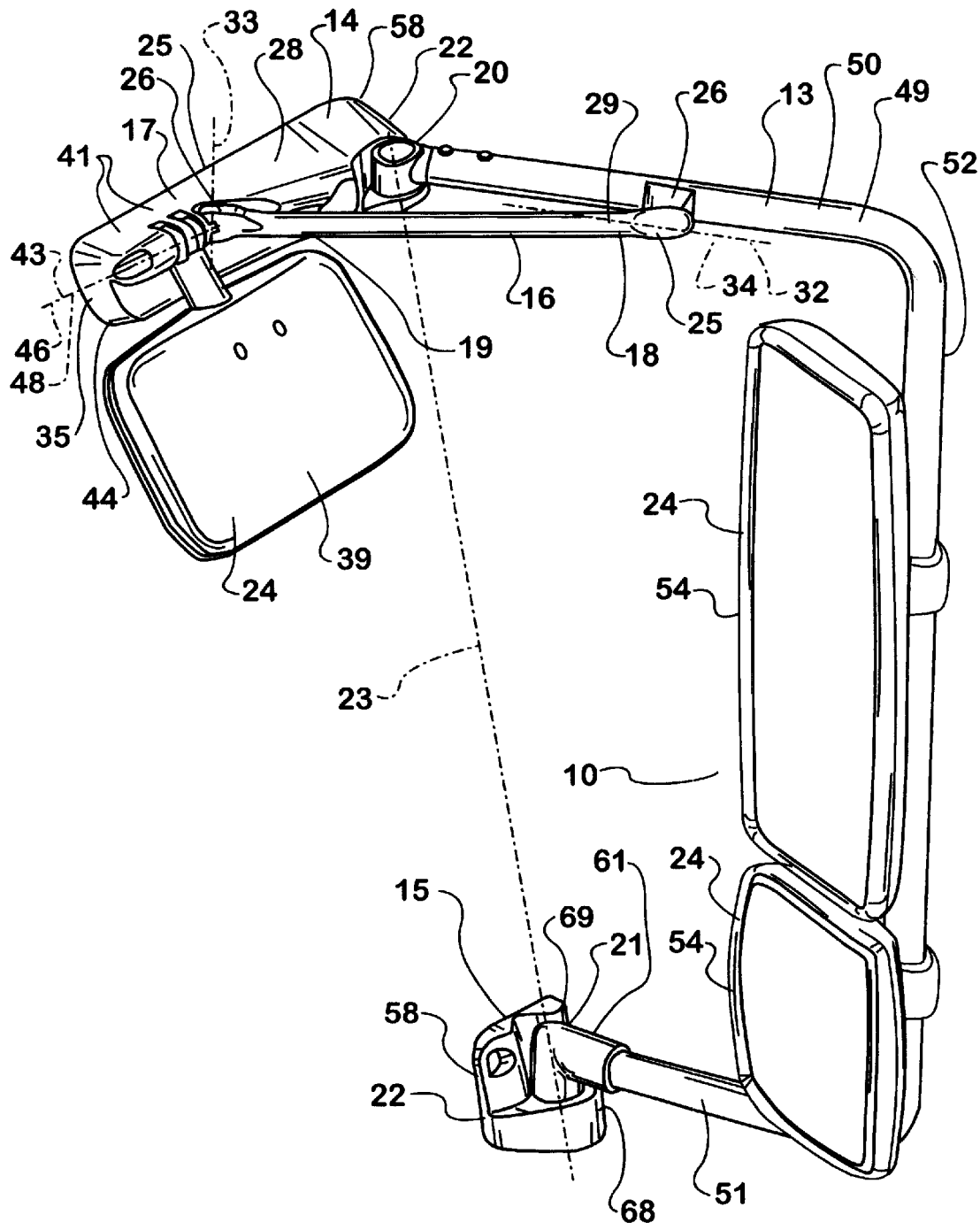
FIG. 5 is a perspective view of the accessory-mounting assembly of the present invention from a first angle.
Figure 6:
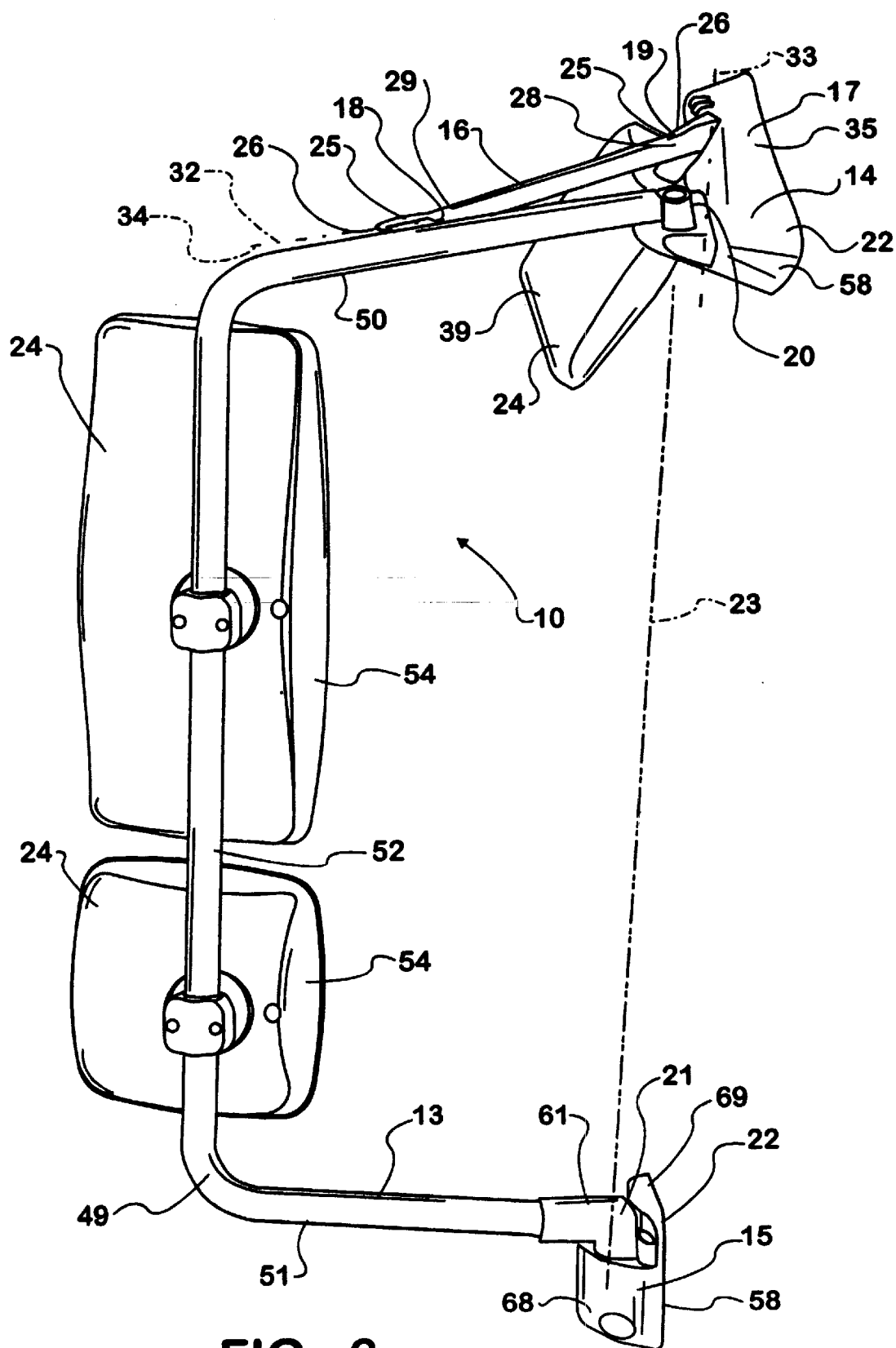
FIG. 6 is a perspective view of the accessory-mounting assembly of the present invention from a second angle.
Figure 7:
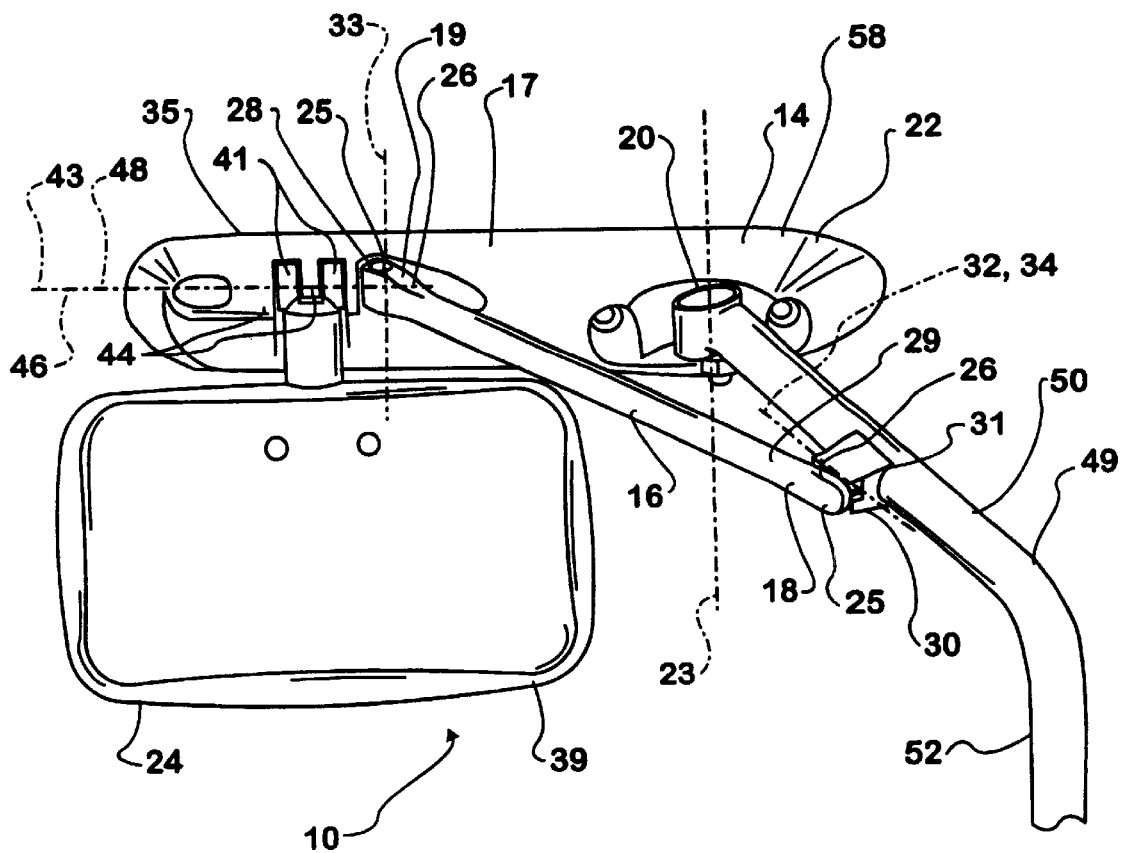
FIG. 7 is a close up perspective view of a portion of the accessory-mounting assembly that includes the anti-rotation member from a first angle.
Figure 8:
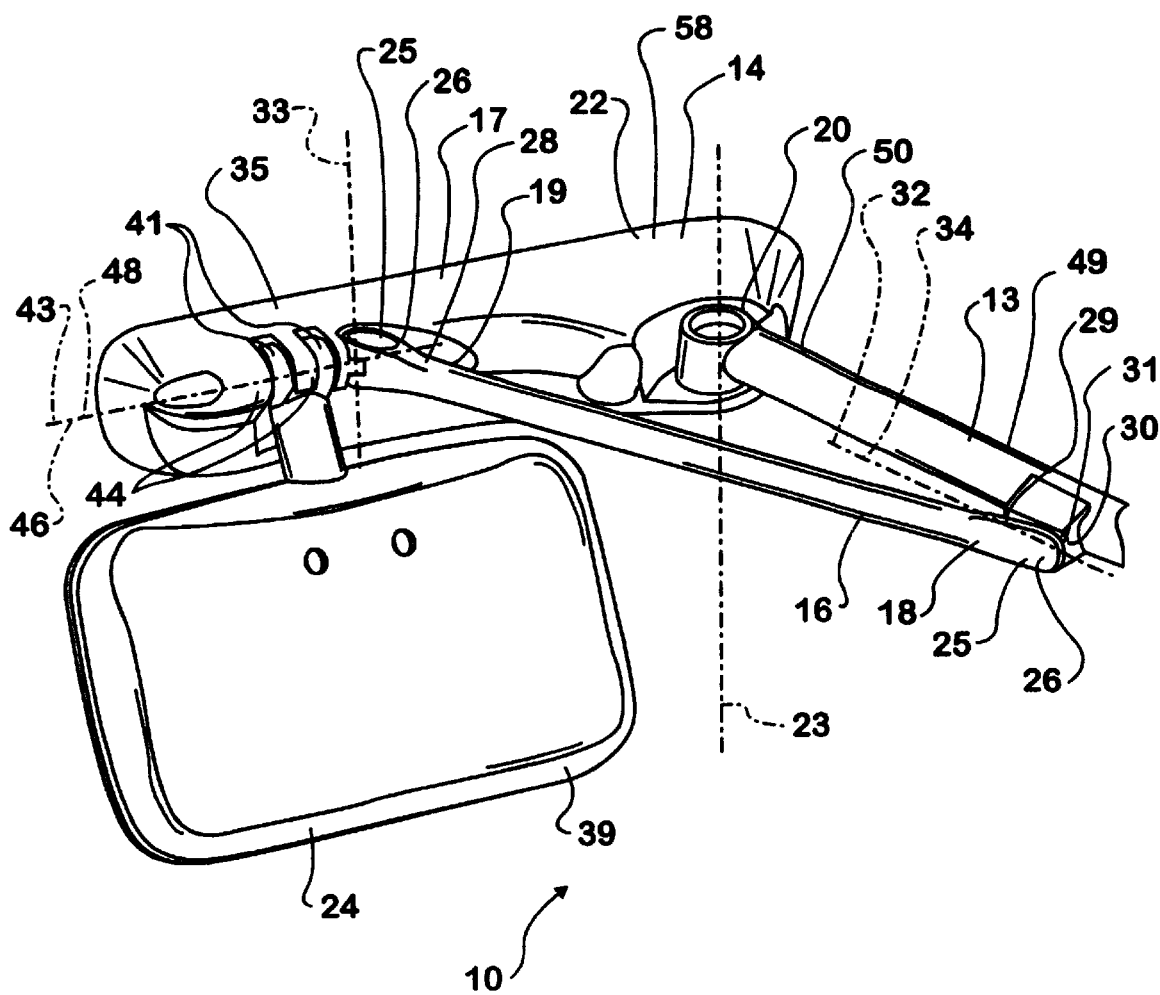
FIG. 8 is a perspective view of a portion of the accessory-mounting assembly that includes the anti-rotation member from a second angle.
Figure 9:
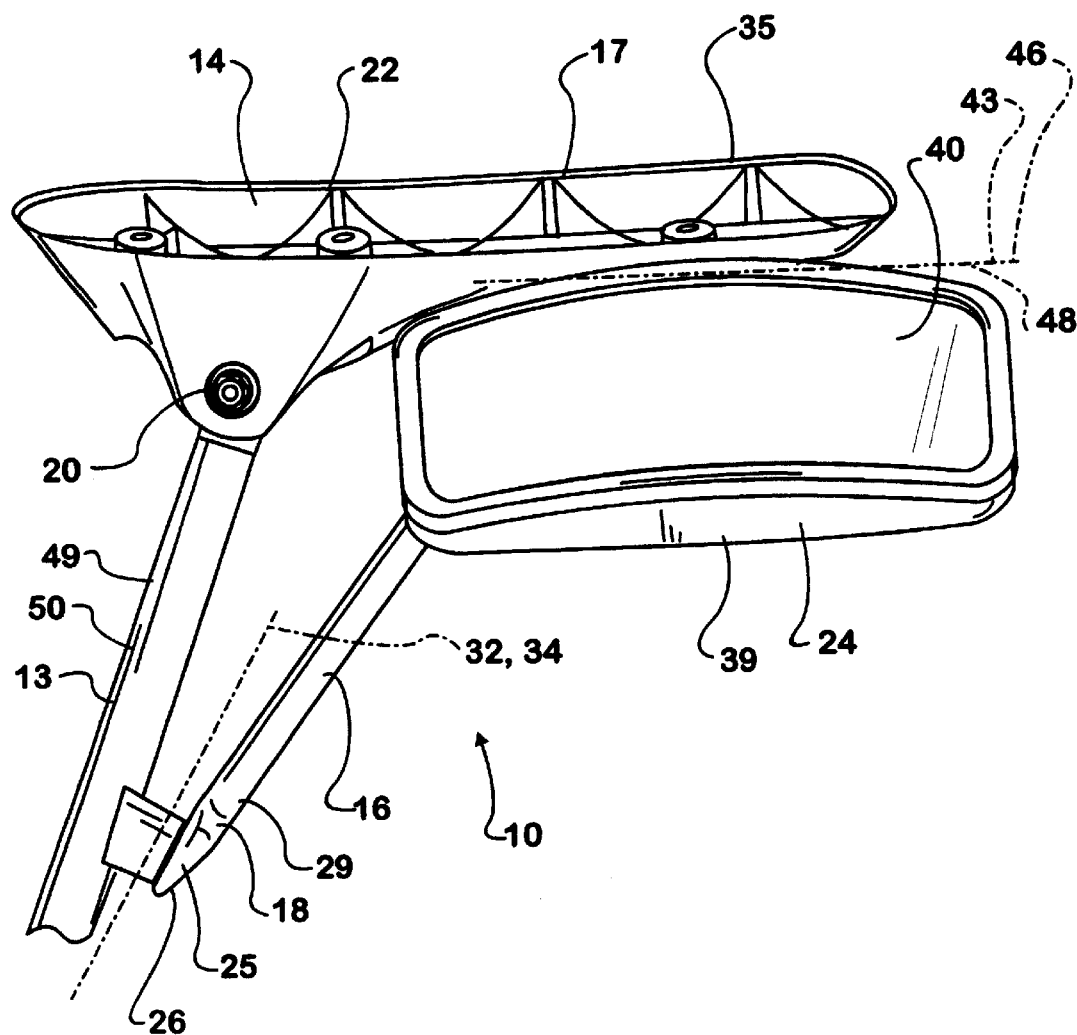
FIG. 9 is a view of the look down mirror and some of the components around the look down mirror from below.
Figure 10:
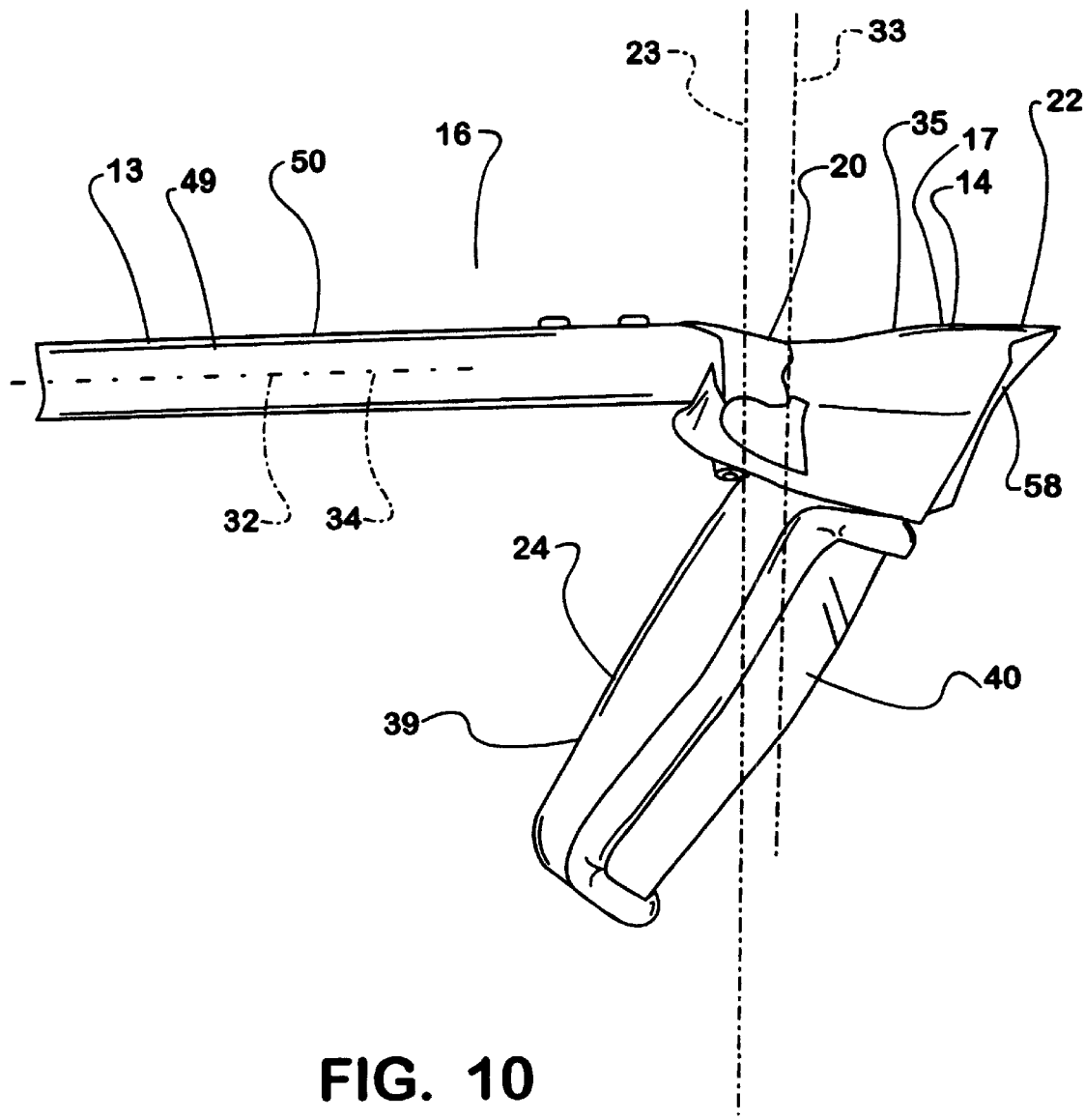
FIG. 10 is a view of the look down mirror and some of the components around the look down mirror from the front.
Figure 11:
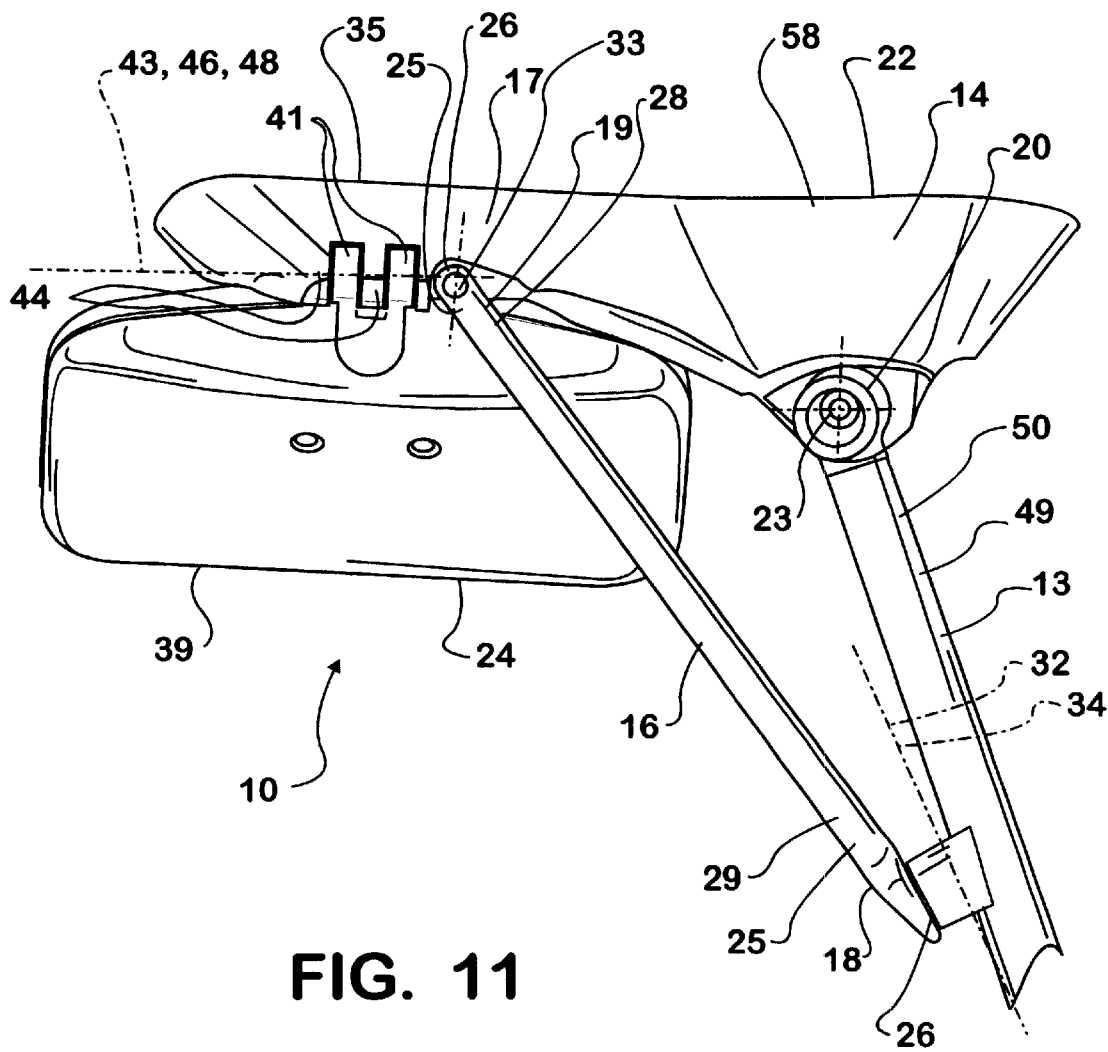
FIG. 11 is a plan view of a portion of the accessory-mounting assembly that includes the anti-rotation member.
Figure 12:
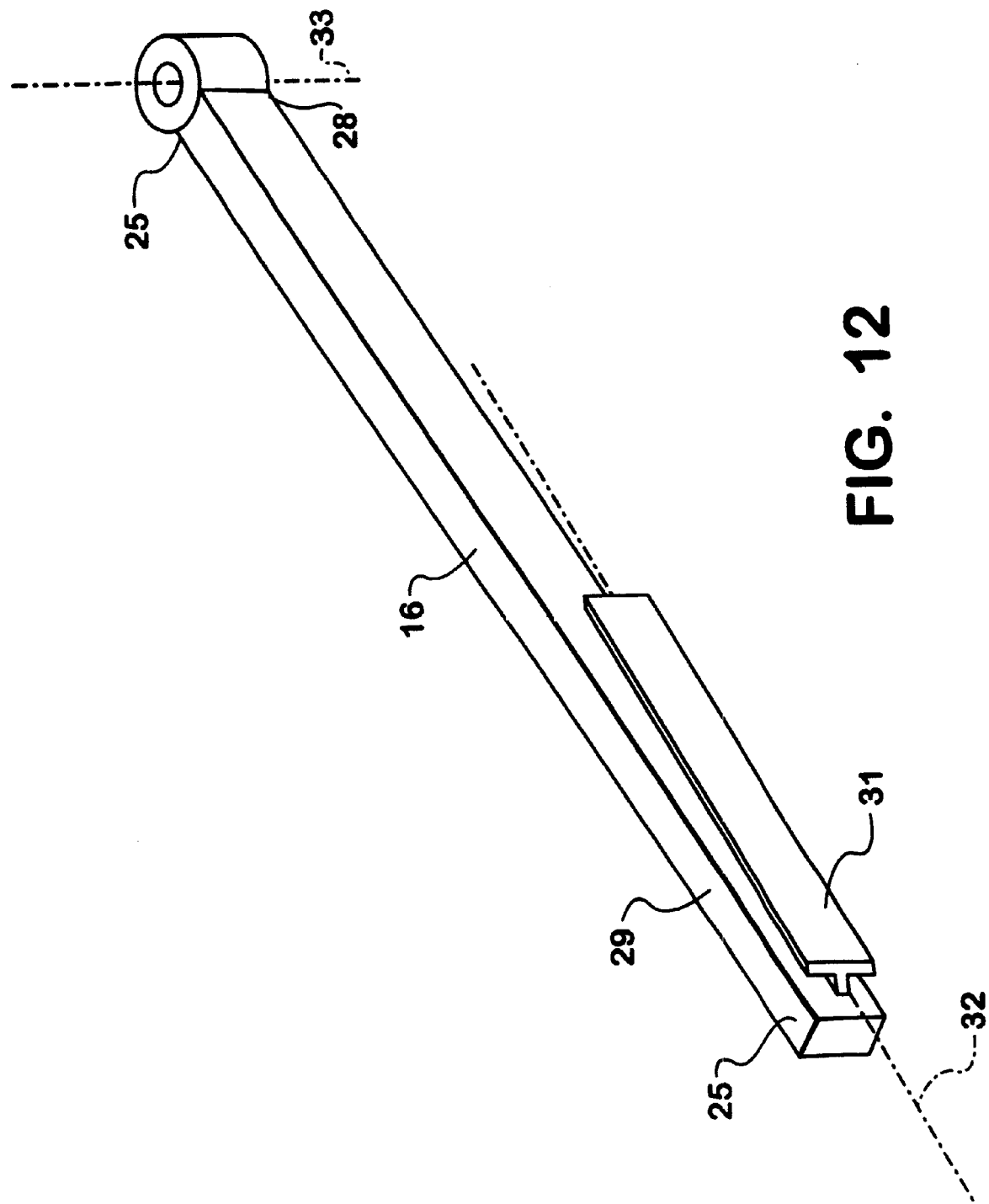
FIG. 12 is a perspective view of one embodiment of an anti-rotation member of the present invention.
Figure 13:
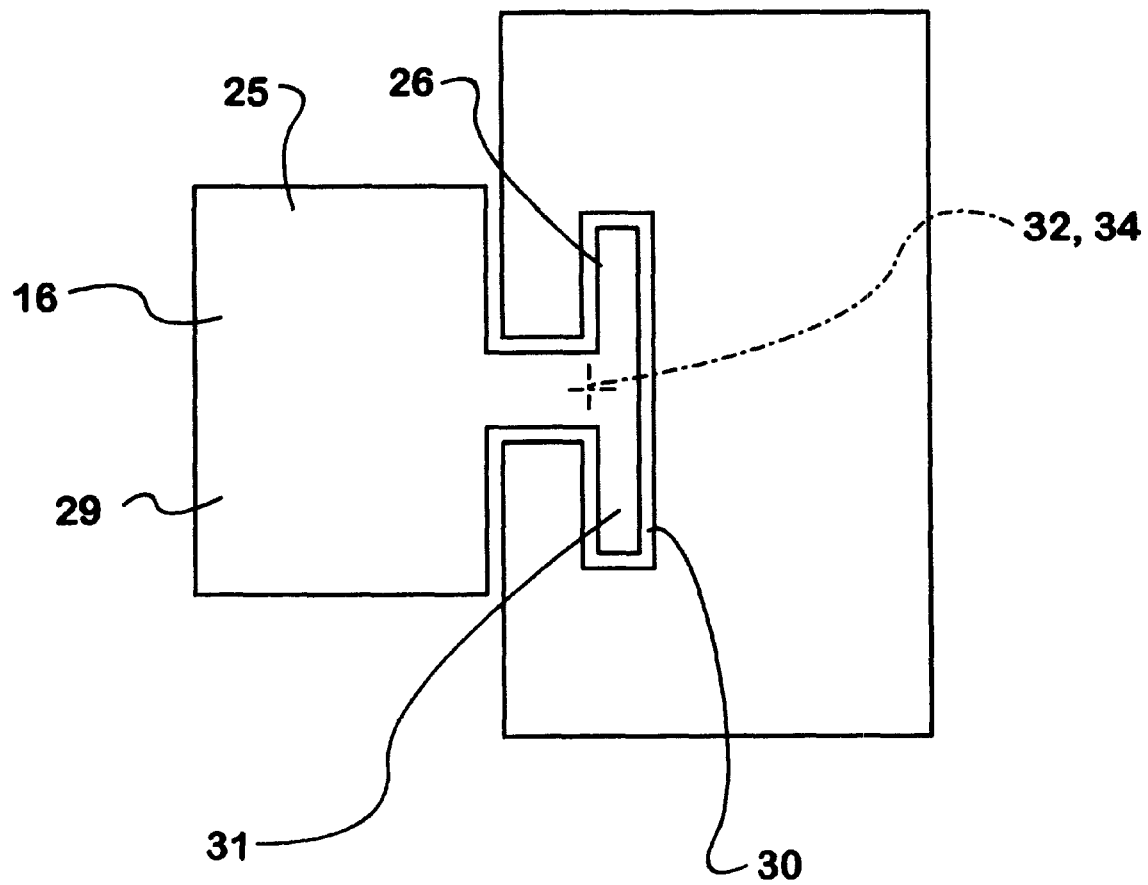
FIG. 13 is an end view of an embodiment of an anti-rotation member of the present invention and the component to which the slide end of the anti-rotation member is slideably engaged showing the slide member engaged within the slide recess.
Figure 14:
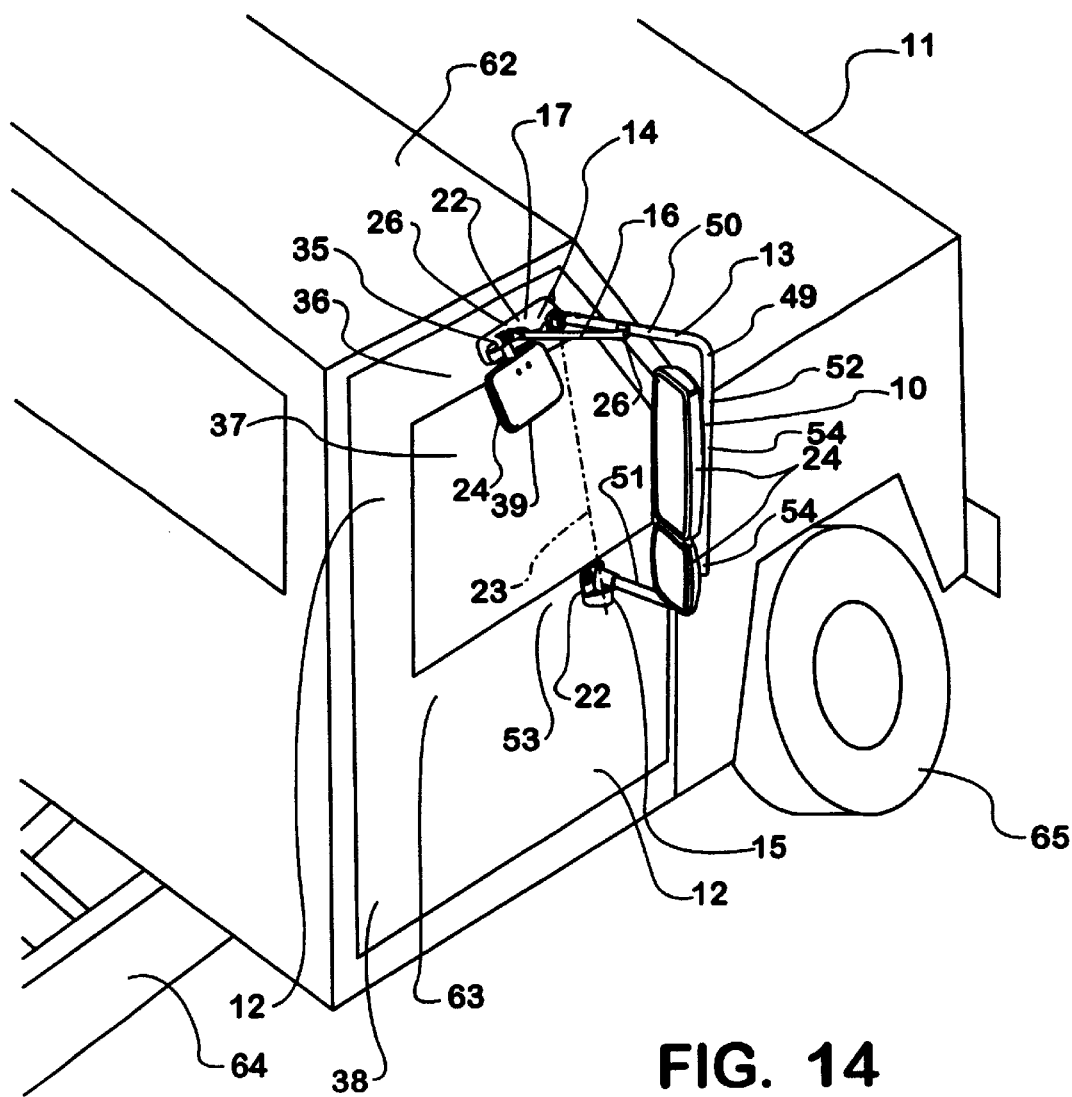
FIG. 14 is a perspective view of a vehicle with the accessory-mounting assembly of the present invention mounted to it.
Figure 15:
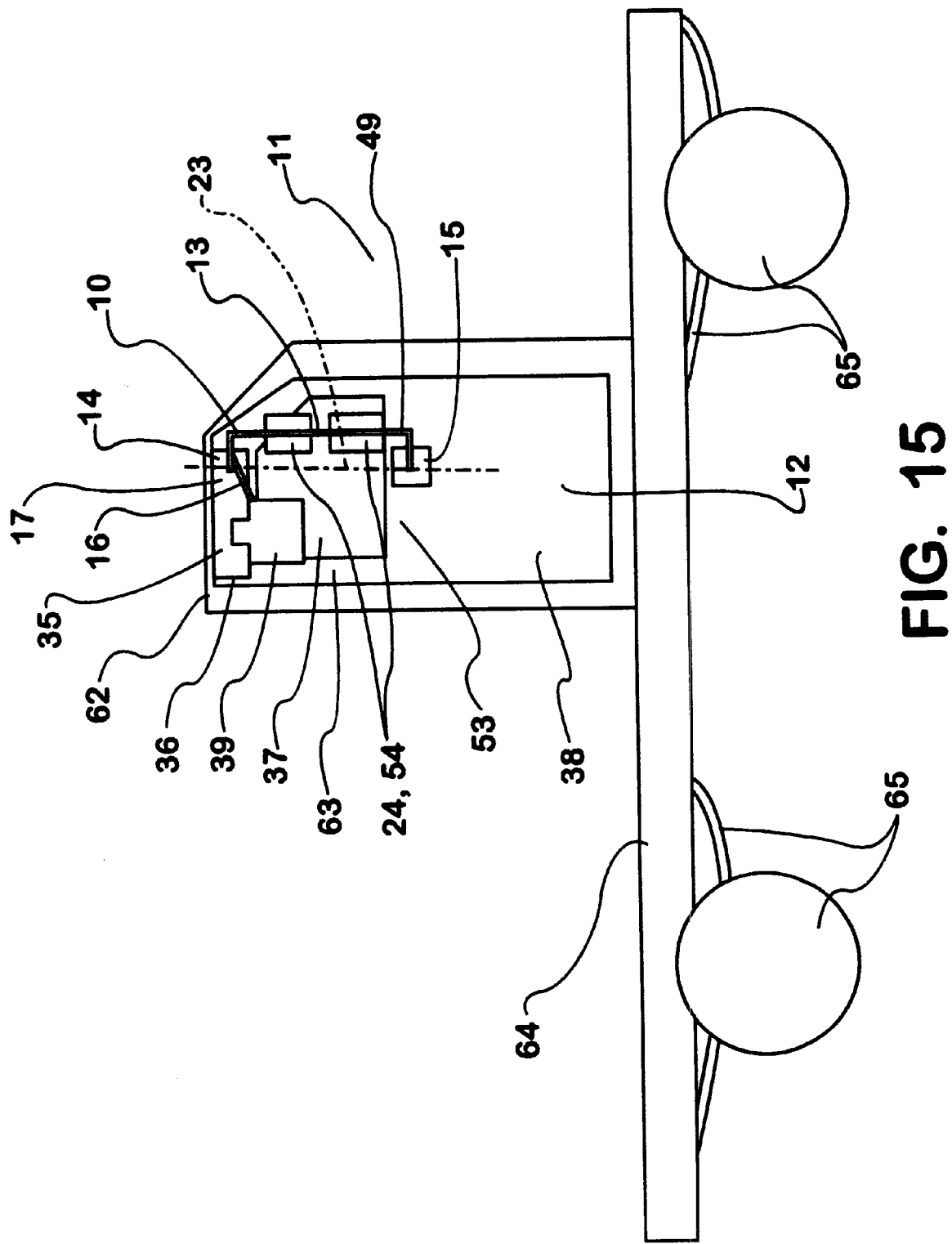
FIG. 15 is a side elevational view of a vehicle with the accessory-mounting assembly according to the present invention mounted to it.
Figure 16:
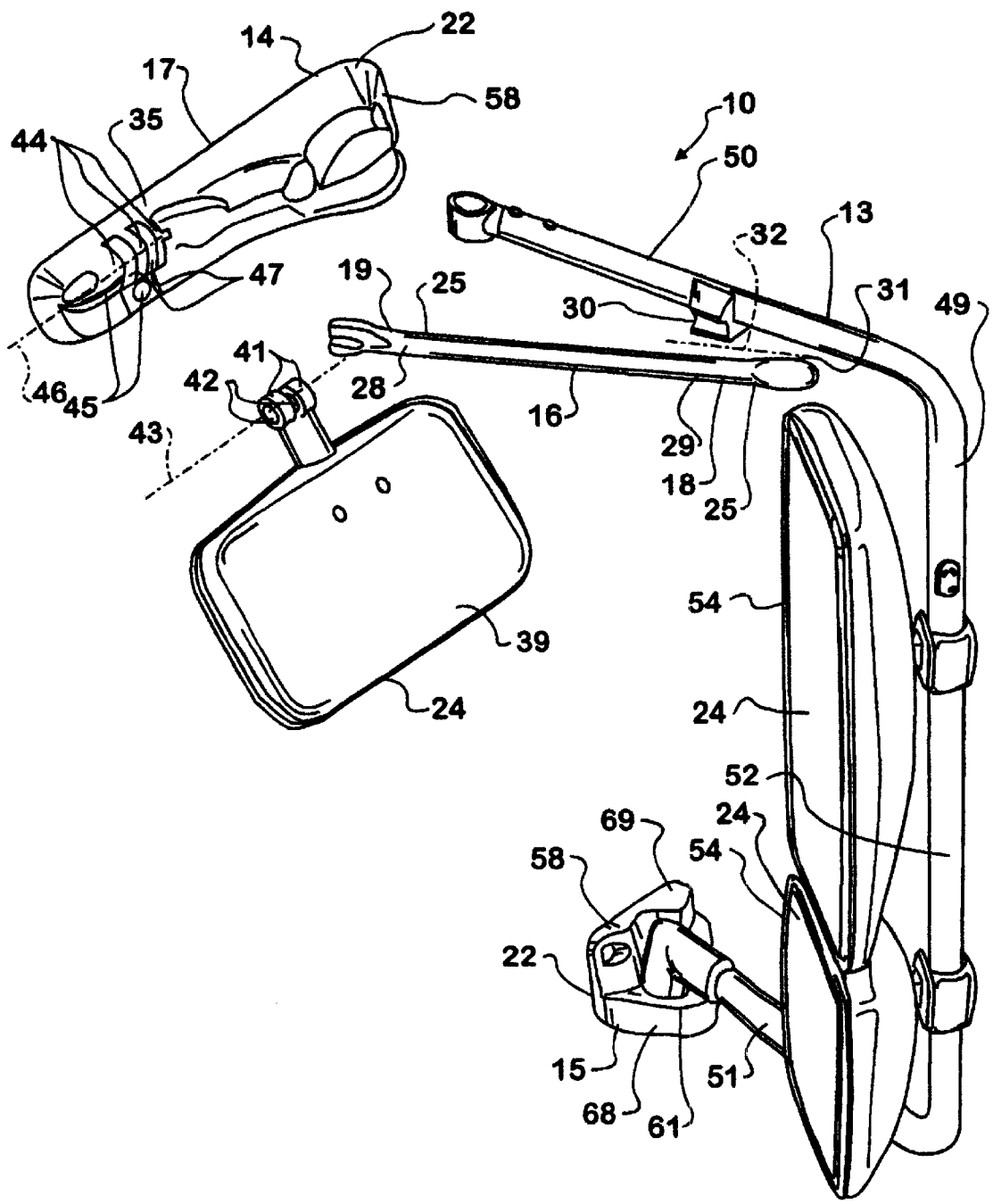
FIG. 16 is a perspective view of the accessory-mounting assembly of the present invention with the components of the accessory-mounting assembly exploded.

In the preferred embodiment the accessory-mounting assembly 10 includes detent structure that facilitates the positioning of the accessory-mounting component 13 in one of a plurality of specific angular positions relative to the pivot axis 23. Once the accessory-mounting component 13 is in one of the plurality of specific angular positions relative to the pivot axis 23 the detent structure resists movement of the accessory-mounting component 13 away from that specific angular position relative to the pivot axis 23. The detent structure provides different amounts of resistance to rotation of the accessory-mounting component 13 about the pivot axis 23 for different relative angular positions of the accessory-mounting component 13 with respect to the pivot axis 23. The detent structure would provide greater resistance to rotation of the accessory-mounting component 13 about the pivot axis 23 when the accessory mounting component 13 is in one of the plurality of specific angular positions relative to the pivot axis than when it is not in one of those positions. Thus, it is easier to rotate the accessory-mounting component 13 to one of the plurality of specific angular positions than it is to rotate the accessory-mounting component 13 away from one of the plurality of specific angular positions. Many specific types of detent structure that would cause the accessory-mounting assembly 10 to behave in this manner are well known. The preferred embodiment of the detent structure is shown in FIGS. 2, 3 and 4. In the preferred embodiment, a detent projection component 68 of the accessory-mounting assembly 10 defines a detent projection surface 55. Also in this embodiment, a detent recess component 69 defines a detent recess surface 56. The shape and orientation of the detent projection surface 55 and detent recess surface 56, and the position of the detent projection component 68 relative to the detent recess component 69, would be such that, on the average, the detent projection surface 55 and the detent recess surface 56 are parallel to one another. The detent projection component 68 and the detent recess component 69 would be positioned relative to one another such that the detent projection surface 55 and the detent recess surface 56 are adjacent to and facing one another. The accessory-mounting assembly 10 is constructed in such a manner that the detent projection surface 55 and the detent recess surface 56 rotate about the pivot axis 23 proportional to and concurrent with rotation of the accessory-mounting component 13 about the pivot axis 23. In the preferred embodiment the detent projection component 68 is either the accessory-mounting component 13 or one of the pivot brackets 22. The detent recess component 69 would be whichever of the accessory-mounting component 13 and the pivot bracket 22 of the accessory-mounting assembly 10 that the detent projection component 68 is not. The detent projection surface 55 and the detent recess surface 56 would each be disposed such that on the average they are perpendicular to the pivot axis 23. One or more detent projections 57 would protrude toward the detent recess surface 56 from the detent projection surface 55. One or more detent recesses 59 would be defined inward of high points 66 of the detent recess surface 56 in a direction away from the detent projection surface 55. There would be a plurality of one or both of the detent projections 57 and the detent recesses 59. In a case where there were a plurality of detent projections 57 the detent projections 57 would be spaced angularly relative to one another about the pivot axis 23. In a case where there were a plurality of detent recesses 59 the detent recesses 59 would be spaced angularly relative to one another about the pivot axis 23. If there were a plurality of both detent projections 57 and detent recesses 59 the detent projections 57 would be spaced at equal angular intervals relative to one another and the detent recesses 59 would also be spaced at equal angular intervals relative to one another. In such a case the equal angular intervals at which the detent projections 57 were spaced would be the same as the equal angular intervals at which the detent recesses 59 were spaced. The accessory-mounting assembly 10 is constructed such that the one or more detent projections 57 are urged in a direction parallel to the pivot axis 23 and toward the detent recess surface 56. Thus, when the detent projection surface 55 and the detent recess surface 56 are disposed at an angular position relative to one another such that one or more detent projections 57 are aligned with one or more detent recesses 59 the detent projections 57 protrude into the detent recesses 59. Subsequent rotation of the detent projection surface 55 relative to the detent recess surface 56 causes contact between the detent projections 57 and the surfaces of the detent recesses 59, in directions perpendicular to the pivot axis 23. This contact between the detent projections 57 and the surfaces of the detent recesses 59 increases the resistance to rotation of the detent projection surface 55 relative to the detent recess surface 56 about the pivot axis 23. The accessory-mounting assembly 10 is, however, constructed in such a manner that if a sufficient moment is applied to the detent projection surface 55 and the detent recess surface 56 the detent projections 57 will move out of engagement with the detent recesses 59. Once the detent projections 57 are no longer engaged within the detent recesses 59, rotation of the detent projection surface 55 relative to the detent recess surface 56 requires significandy less moment. The accessory-mounting assembly 10 can be constructed in any of a number of ways that would cause the detent projections 57 to be urged toward the detent recess surface 56 while still allowing detent projections 57 to be brought into and out of engagement with the detent recesses 59. As is shown in FIG. 2 the accessory-mounting assembly 10 may have "spring loaded" detent projections that employ one or more springs 60 that urge the detent projections 57 toward the detent recess surface 56. When such "spring loaded" detent projections 57 are engaged to detent recesses 59 and an increasing moment is applied to the detent projection surface 55 and detent recess surface 56, the detent recess surface 56 applies increasing forces to the detent projections 57 in opposition to the springs 60. Eventually, the forces of the one or more springs 60 are overcome by the forces applied to the detent projections 57 by the detent recess surface 56 and the detent projections 57 are driven away from the detent recess surface 56 and out of engagement with the detent recesses 59. Other constructions of the detent structure may include no springs and may be very rigid in nature. Such rigid constructions of the detent structure allow the detent projections 57 to move out of engagement with the detent recesses only through elastic deformation of the detent projection component 68 and the detent recess component 69. As is shown in FIG. 2, in the preferred embodiment the detent recess component 69 is a mounting elbow 61 that is disposed at an end of the second leg 51 of the c-shaped component 49 that is engaged to the second pivot bracket 15. In this embodiment, the detent recess surface 56 is defined on a lower surface of the mounting elbow 61. Also in the preferred embodiment, the detent projection component 68 is the second pivot bracket 15.

As was mentioned above, the accessory-mounting assembly 10 of the present invention is preferably mounted to a vehicle 11. The vehicle 11 would have a number of exterior surfaces 12, as mentioned above, to some of which the first pivot bracket 14, the second pivot bracket 15, the anti-rotation bracket 17, and the component-mounting bracket 35 would be fixedly engaged. The vehicle 11 would have an occupant cabin 62 within which occupants of the vehicle 11 may reside. The occupant cabin 62 would have a number of exterior surfaces 12. The door 38, mentioned above, would likely be engaged to the occupant cabin 62. The door 38 would likely have a window frame 63 that borders a window 37. The window frame 63 would likely be comprised of a window frame upper portion 36 disposed above the window 37 and a window frame lower portion 53 disposed below the window 37. As was mentioned above, the first pivot bracket 14, the anti-rotation bracket 17, and the component-mounting bracket 35, are preferably fixedly engaged to the window frame upper portion 36. The second pivot bracket 15 is preferably fixedly engaged to the window frame lower portion 53. The occupant cabin 62 would be engaged to a frame 64 of the vehicle 11. A suspension system 65, for supporting the vehicle 11, would be engaged to the frame 64.

The present invention further includes a method of assembling the accessory-mounting assembly 10 and installing the assembled accessory-mounting assembly to a vehicle 11. In this method the components of the accessory-mounting assembly 10 are fully assembled to one another before the accessory-mounting assembly 10 is installed on a vehicle 11. The order in which the components of the accessory-mounting assembly 10 are engaged to one another is not important but, rather, the fact that all of the components are assembled to one another before the accessory-mounting assembly 10 is installed to the vehicle 11 as an assembled unit. One or more accessories 24 must be engaged to the accessory-mounting component 13. Preferably at least one of the one or more accessories 24 engaged to the accessory-mounting component 13 is a rear-view mirror 54. The accessory-mounting component 13 must be engaged to the first pivot bracket 14 in a pivotal manner. The accessory-mounting component 13 must be engaged to the second pivot bracket 15 in a pivotal manner. The first end 18 of the anti-rotation member 16 would be engaged to the accessory-mounting component 13. The second end 19 of the anti-rotation member 16 would be engaged to the anti-rotation bracket 17. The construction of the anti-rotation member 16, the accessory-mounting component 13, and the anti-rotation bracket 17 and the manner in which they are engaged to one another is such that the engagements between the anti-rotation member 16 and the other components are "break away" style engagements. An accessory 24 would be engaged directly to the component-mounting bracket 35. Preferably the accessory that is engaged directly to the component-mounting bracket 35 is a look down mirror 39. After all of the components of the accessory-mounting assembly 10 are assembled together as a unit the accessory-mounting assembly 10 is taken to the vehicle 11 and installed to the vehicle 11. As part of installing the accessory-mounting assembly 10 to the vehicle the first pivot bracket 14, the anti-rotation bracket 17, and the component-mounting bracket 35, which are integrally engaged to one another, are fixedly engaged to an exterior surface 12 of the vehicle 11. Also during the installation of the accessory-mounting assembly 10 to the vehicle the second pivot bracket 15 is fixedly engaged to exterior surface(s) of the vehicle 11. Preferably the first pivot bracket 14, the anti-rotation bracket 17, and the component-mounting bracket 35 are fixedly engaged to a window frame upper portion 36. Preferably the second pivot bracket 15, is fixedly engaged to a window frame lower portion 53 in a position relative to the first pivot bracket 14, the anti-rotation bracket 17, and the component-mounting bracket 35 such that the pivot axis 23 is oriented substantially vertically.

Those skilled in the art will appreciate that modifications could be made to the invention as described without departing from the spirit and scope of the invention and thus the scope of the invention is limited only by the following claims.

We claim:

1. A vehicle, comprising:
   (a) a frame;
   (b) an occupant cabin engaged to said frame;
   (c) a suspension system, for supporting said vehicle, engaged to said frame;
   (d) wherein said frame, said occupant cabin, and said suspension system define a plurality of exterior surfaces of said vehicle;
   (e) an accessory-mounting assembly engaged to one or more of said plurality of exterior surfaces of said vehicle;
   (f) wherein said accessory-mounting assembly is comprised of a first pivot bracket fixedly engaged to one or more of said exterior surfaces of said vehicle;
   (g) wherein said accessory-mounting assembly is comprised of a second pivot bracket fixedly engaged to one or more of said exterior surfaces of said vehicle;
   (h) wherein said accessory-mounting assembly is comprised of an accessory-mounting component pivotally engaged to said first pivot bracket and said second pivot bracket;
   (i) wherein said accessory-mounting assembly is comprised of one or more accessories mounted to said accessory-mounting component;
   (j) wherein said accessory-mounting component is pivotal about a pivot axis that extends through a first point of engagement between said accessory-mounting component and said first pivot bracket and through a second point of engagement between said accessory-mounting component and said second pivot bracket;
   (k) wherein said accessory-mounting assembly is comprised of an anti-rotation member that is engaged at a first end to said accessory-mounting component and at a second end to an anti-rotation bracket;
   (l) wherein said anti-rotation member is engaged to said accessory-mounting component at a point distant from said pivot axis;
   (m) wherein said anti-rotation member is engaged to said anti-rotation bracket at a point distant from said pivot axis;
   (n) wherein rotation of said accessory-mounting component about said pivot axis is only possible when said anti-rotation member moves with respect to said accessory-mounting component and said anti-rotation bracket;
   (o) wherein said anti-rotation bracket is integrally engaged to said first pivot bracket;
   (p) wherein said anti-rotation bracket and said first pivot bracket are engaged to one another as a result of being formed as a unit with one another
   (q) wherein said engagement between said first end of said anti-rotation member and said accessory-mounting component and said engagement between said second end of said anti-rotation member and said anti-rotation bracket are "break away" style engagements;
   (r) wherein said accessory-mounting assembly is constructed such that when relatively large force(s), in directions perpendicular to said pivot axis, are applied to said accessory-mounting component or said one or more accessories mounted to said accessory mounting component said "break away" engagements of said anti-rotation member to other components of said accessory-mounting assembly cause said anti-rotation member to undergo "break away" motions as said accessory-mounting component pivots about said pivot axis in a direction opposite said relatively large force (s); and
   (s) wherein said "break away" engagements are such that said accessory-mounting component is prevented from rotating about said pivot axis unless said accessory-mounting assembly is subjected to forces greater than those imparted to said accessory-mounting assembly during normal operation of said vehicle.

2. The vehicle of claim 1, wherein:
   (a) said accessory-mounting assembly is further comprised of a component-mounting bracket;
   (b) said accessory-mounting assembly is further comprised of one or more accessories mounted directly to said component-mounting bracket; and
   (c) wherein said component-mounting bracket is integrally engaged to said first pivot bracket.

3. The vehicle of claim 2, wherein:
   (a) said vehicle is further comprised of a door engaged to said occupant cabin;
   (b) said door has a window frame that surrounds a window of said door;
   (c) said window frame is comprised of a window frame upper portion disposed above said window and a window frame lower portion disposed below said window;
   (d) said first pivot bracket, said anti-rotation bracket, and said component-mounting bracket which are integrally engaged to one another are fixedly engaged to said window frame upper portion;
   (e) said one or more accessories that are directly engaged to said component-mounting bracket are comprised of a look down mirror; and
   (f) said look down mirror extends downwardly from said component-mounting bracket in an orientation such that a reflecting surface of said look down mirror is disposed adjacent to and facing said window of said vehicle.

4. The vehicle of claim 3, wherein:
   (a) said second pivot bracket is fixedly engaged to said window frame lower portion of said door of said vehicle;
   (b) said first pivot bracket and said second pivot bracket are positioned relative to one another such that said pivot axis is oriented substantially vertically;
   (c) said accessory-mounting component is a c-shaped component comprised of a first leg, a second leg, and an intermediate member engaged between said first leg and said second leg;
   (d) said first leg is pivotally engaged to said first pivot bracket;
   (e) said second leg is pivotally engaged to said second pivot bracket;

(f) said intermediate member is engaged to said first leg at an end of said first leg opposite an end of said first leg that is pivotally engaged to said first pivot bracket;

(g) said intermediate member is engaged to said second leg at an end of said second leg opposite an end of said second leg that is pivotally engaged to said second pivot bracket;

(h) said one or more accessories mounted to said accessory-mounting component are comprised of one or more rear-view mirrors mounted to said intermediate member; and (i) said first end of said anti rotation member is engaged to said first leg of said c-shaped component at a point distant from said end of said first leg that is engaged to said first pivot bracket.

5. The vehicle of claim 4, wherein:

(a) a first of said "break away" style engagements is comprised of a pivotal engagement, about an anti-rotation member pivot axis, of a pivot end of said anti-rotation member to either said anti-rotation bracket or said accessory-mounting component;

(b) a second of said "break away" style engagements is a slideable engagement of a slide end of said anti-rotation member to whichever of said anti-rotation bracket and said accessory-mounting component said pivot end of said anti-rotation member is not engaged;

(c) said slide end of said anti-rotation member or a component to which said slide end of said anti-rotation member is slideably engaged defines a slide recess;

(d) a slide member is engaged to whichever of said slide end of said anti-rotation member and said component to which said slide end of said anti-rotation member is slideably engaged, does not define said slide recess;

(e) said slide member is disposed within said slide recess in a manner such that said slide member is slideable within said slide recess along a slide axis;

(f) said slide member and said component that defines said slide recess are constructed and engaged to one another in a manner such that friction between said slide member and surfaces of said slide recess resists sliding of said slide member within said slide recess along said slide axis;

(g) said anti-rotation member and other components of said accessory-mounting assembly are constructed and engaged to one another in an orientation such that said slide axis is oriented substantially perpendicular to said anti-rotation member pivot axis;

(h) said slide member and said component that defines said slide recess are constructed and engaged to one another in such a manner that a magnitude of said friction between said slide member and said surfaces of said slide recess is low enough that when said accessory-mounting component or said one or more accessories mounted to said accessory-mounting component are subjected to relatively large force(s) in directions perpendicular to said pivot axis, said friction between said slide member and said surfaces of said slide recess is overcome by forces imparted upon said slide member and said component that defines said slide recess and said slide member slides along said slide axis within said slide recess and said "break away" style engagements allow "break away" motions of said anti-rotation member relative to other components of said accessory-mounting assembly to occur and thus allow said accessory-mounting component to rotate about said pivot axis in directions opposite said relatively large force(s);

(i) said "break away" motions of said anti-rotation member are comprised of said slide end of said anti-rotation member sliding along said slide axis and said pivot end of said anti-rotation member pivoting about said anti-rotation member pivot axis; and (j) said slide member and said component that defines said slide recess are constructed and engaged to one another in such a manner that said friction between said slide member and said surfaces of said slide recess is of a magnitude such that relatively small forces imparted upon said slide member and said component that defines said slide recess as a result of events that occur during normal operation of said vehicle are insufficient to overcome said friction between said slide member and said surfaces of said slide recess and thus said slide member is prevented from sliding within said slide recess by said friction between said slide member and said surfaces of said slide recess and said accessory-mounting component is prevented from being caused to rotate about said pivot axis as a result of said events that occur during normal operation of said vehicle.

6. The vehicle of claim 5, wherein:

(a) said slide recess and said slide member are of a length sufficient to allow said slide member and said component that defines said slide recess to remain engaged to one another when said accessory-mounting component is positioned at any position within a range of angles relative to said pivot axis;

(b) said accessory-mounting assembly includes detent structure that is constructed and engaged to other components of said accessory-mounting assembly in a manner such that rotation of said accessory-mounting component about said pivot axis requires a moment of different magnitude for different relative angular positions of said accessory-mounting component within said range of angles relative to said pivot axis; and (c) said detent structure is constructed and engaged to said accessory-mounting assembly in such a manner that said moment required to rotate said accessory-mounting component about said pivot axis is greater when said accessory-mounting component is in one of a plurality of specific angular positions relative to said pivot axis than when said accessory-mounting component is in an angular position relative to said pivot axis other than one of said plurality of specific angular positions relative to said pivot axis.

7. The vehicle of claim 6, wherein:

(a) said detent structure is comprised of a detent projection component that defines a detent projection surface;

(b) said detent structure is comprised of a detent recess component that defines a detent recess surface;

(c) said detent projection component is either said accessory-mounting component or a pivot bracket to which said accessory-mounting component is pivotally engaged;

(d) said detent recess component is whichever of said accessory-mounting component and said pivot bracket to which said accessory-mounting component is pivotally engaged that said detent projection component is not;

(e) said detent projection surface and said detent recess surface are disposed adjacent to and facing one another;

(f) said detent projection surface and said detent recess surface are each disposed so that, on average, said detent projection surface and said detent recess surface are perpendicular to said pivot axis;

(g) said accessory-mounting assembly is constructed such that rotation of said detent projection surface relative to said detent recess surface must occur concurrently with and in proportion to rotation of said accessory-mounting component about said pivot axis;

(h) one or more detent projections protrude from said detent projection surface toward said detent recess surface;

(i) said detent recess surface defines one or more detent recesses that extend inward of high points of said detent recess surface in a directions away from said detent projection surface;

(j) said accessory-mounting assembly includes either a plurality of said detent projections which protrude from said detent projection surface or a plurality of said detent recesses which are defined by said detent recess surface;

(k) each of whichever of said plurality of detent projections or said plurality of detent recesses said accessory-mounting assembly is comprised of, are spaced angularly relative to one another about said pivot axis;

(l) said accessory-mounting assembly is constructed such that each detent projection is urged in a direction parallel to said pivot axis and toward said detent recess surface so that when said detent recess surface and said detent projection surface are at an angular position relative to one another such that a detent projection is aligned with a detent recess said detent projection protrudes into said detent recess and thereafter resists angular movement of said detent recess surface relative to said detent projection surface; and (m) said accessory-mounting assembly is constructed such that if a moment of sufficient magnitude is applied to said detent recess surface and said detent projection surface any detent projections that are engaged within detent recesses will move out of engagement with said detent recesses into which said detent projections protrude and said detent recess surface and said detent projection surface will rotate relative to one another to positions that correlate to positions of said accessory-mounting component other than one of said plurality of specific angular positions.

* * * * *